United States Patent [19]
Brownmiller et al.

[11] Patent Number: 5,704,036
[45] Date of Patent: Dec. 30, 1997

[54] SYSTEM AND METHOD FOR REPORTED TROUBLE ISOLATION

[75] Inventors: Curtis Brownmiller, Richardson; Mike Bencheck, Garland; Minh Tran, Plano; Robert Branton, Farmers Branch; Mark DeMoss, The Colony; Steve Landon, Richardson, all of Tex.

[73] Assignee: MCI Communications Corporation, Washington, D.C.

[21] Appl. No.: 672,812

[22] Filed: Jun. 28, 1996

[51] Int. Cl.$^6$ .................................................. G06F 11/30
[52] U.S. Cl. ................................ 395/183.19; 370/907
[58] Field of Search .................... 395/183.18, 183.16, 395/183.08, 183.01, 731, 741, 742, 183.19, 200.15, 907, 914, 216, 184.01; 371/20.1; 370/244, 242

[56] References Cited

U.S. PATENT DOCUMENTS

| | | | |
|---|---|---|---|
| 4,937,825 | 6/1990 | Ballard et al. | 371/20.1 |
| 5,157,667 | 10/1992 | Carusone, Jr. et al. | 395/183.21 |
| 5,189,674 | 2/1993 | Shimizu | 371/20.1 |
| 5,233,600 | 8/1993 | Pekarske | 370/14 |
| 5,299,201 | 3/1994 | Carusone, Jr. et al. | 371/5.1 |
| 5,412,652 | 5/1995 | Lu | 370/85.12 |
| 5,436,909 | 7/1995 | Dev et al. | 395/182.02 |
| 5,452,306 | 9/1995 | Turudic et al. | 370/110.1 |
| 5,455,832 | 10/1995 | Bowmaster | 371/20.1 |
| 5,463,634 | 10/1995 | Smith et al. | 371/20.6 |
| 5,483,520 | 1/1996 | Eychenne et al. | 370/16.1 |
| 5,566,162 | 10/1996 | Gruber et al. | 370/13 |

OTHER PUBLICATIONS

IEEE Publication, Banerjee et al., ISDN Primary Rate Access Maintenance, 1989, pp. 0058–0062.
IEEE Publication, Cadieux et al., A New Network Element for Performance Monitoring and Test Access Spanning the Digital Hierarchy, 1990, pp. 334.4.1–334.4.5.
IEEE Publication, Kerschberg et al., Intelligent Network Management: A Heterogeneous Knowledge Source Approach, 1990, pp. 314–316.
IEEE Publication, Mageed et al., Fault Detection and Identification Using a Hierarchial Neural Network–Based System, 1993, pp. 338–343.

*Primary Examiner*—Robert W. Beausoliel, Jr.
*Assistant Examiner*—Scott T. Baderman

[57] ABSTRACT

A system and method for isolating a problem in a network. Upon a report of error activity in a first signal transport level, a first layer in the network management system uses performance data to identify the highest signal transport level that exhibits simultaneous error activity. The first layer attempts to isolate the problem if it determines that it has access to enough information.

19 Claims, 11 Drawing Sheets

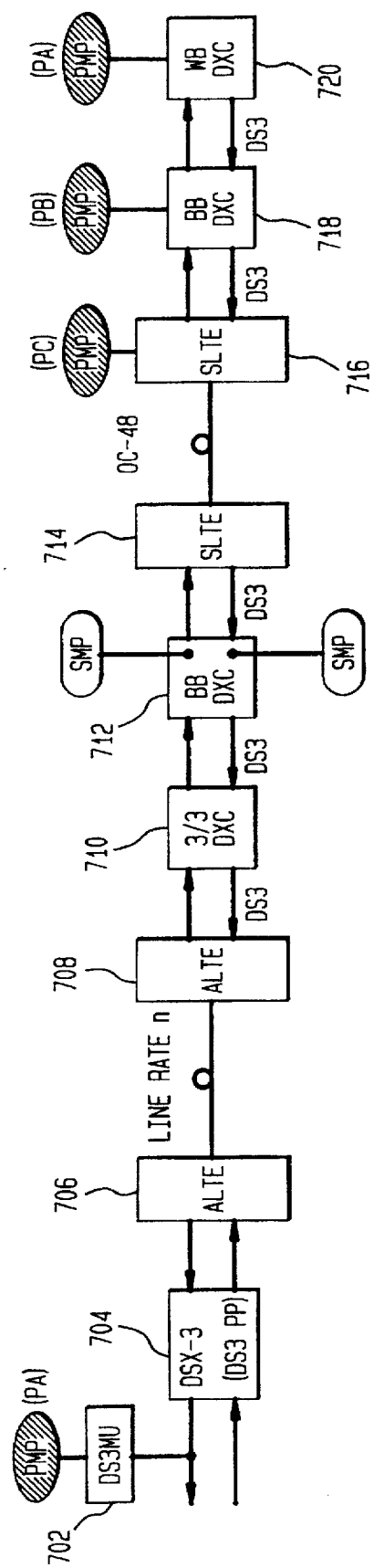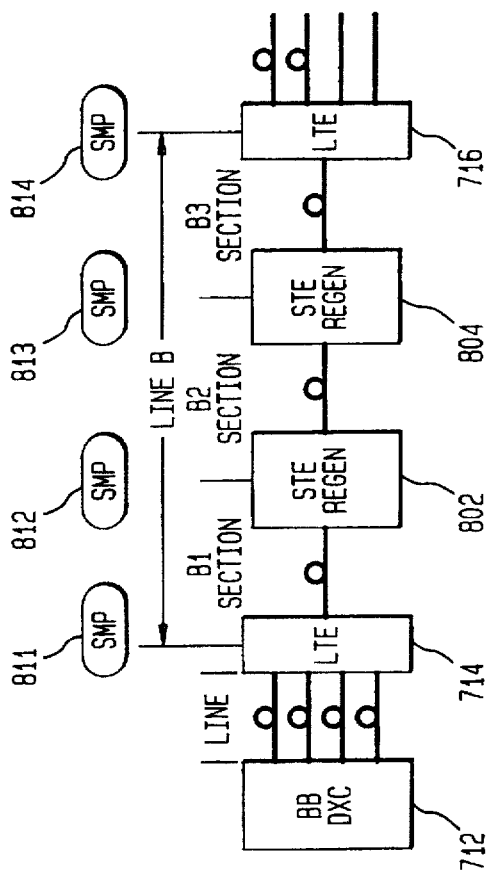
FIG. 7
FIG. 8

SYSTEM AND METHOD FOR REPORTED TROUBLE ISOLATION

CROSS-REFERENCE TO OTHER APPLICATIONS

The following applications of common assignee contain some common disclosure as the present application:

U.S. patent application entitled "System and Method for Identifying the Technique Used for Far-End Performance Monitoring of a DS1 at a Customer Service Unit", filed Jun. 25, 1996, Ser. No. 08/671,028.

U.S. patent application entitled "System and Method for Formatting Performance Data In a Telecommunications System", filed Jun. 25, 1996, Ser. No. 08/670,905.

U.S. patent application entitled "System and Method for Reported Root Cause Analysis", filed Jun. 28, 1996, Ser. No. 08/670,844.

U.S. patent application entitled "System and Method for Unreported Root Cause Analysis", filed Jun. 28, 1996, Ser. No. 08/668,516.

U.S. patent application entitled "Enhanced Correlated Problem Alert Signals", filed Jun. 28, 1996, Ser. No. 08/670,848.

U.S. patent application entitled "Correlated Problem Alert Signals", filed Jun. 28, 1996, Ser. No. 08/673,271.

U.S. patent application entitled "Raw Performance Monitor Correlated Problem Alert Signals", filed Jun. 28, 1996, Ser. No. 08/670,847.

U.S. patent application entitled "System and Method for Unreported Trouble Isolation", filed Jun. 28, 1996, Ser. No. 08/672,513.

U.S. patent application entitled "Monitor Point Identification", filed Jun. 28, 1996, Ser. No. 08/672,512.

U.S. patent application entitled "Service Management Layer Threshold Setting", filed Jun. 28, 1996, Ser. No. 08/670,845.

U.S. patent application entitled "Monitor Point Activation", filed Jun. 28, 1996, Ser. No. 08/672,356.

U.S. patent application entitled "System and Method for Tracking and Monitoring Network Elements", filed Jun. 25, 1996, Ser. No. 08/671,029.

The above-listed applications are incorporated herein by reference in their entireties.

BACKGROUND OF THE INVENTION

1. Field of the Invention

The present invention relates generally to network management systems, and more specifically is directed toward the isolation of a network problem that causes error activity at one or more signal transport levels.

2. Related Art

Telecommunication service providers (e.g., MCI Telecommunications Corporation) provide a wide range of services to their customers. These services range from the transport of a standard 64 kbit/s voice channel (i.e., DS0 channel) to the transport of higher rate digital data services (e.g., video). Both voice channels and digital data services are transported over the network via a hierarchy of digital signal transport levels. For example, in a conventional digital signal hierarchy 24 DS0 channels are mapped into a DS1 channel. In turn, 28 DS1 channels are mapped into a DS3 channel.

Routing of these DS1 and DS3 channels within a node of the network is performed by digital cross-connect systems. Digital cross-connect systems typically switch the channels at the DS1 and DS3 signal levels. Transmission of channels between nodes is typically provided via fiber-optic transmission systems. Fiber-optic transmission systems can multiplex a plurality of DS3 channels into a higher rate transmission over a single pair of fibers. In one example, signal formats for the fiber-optic transmission systems are defined by the manufacturer. These proprietary systems are referred to as asynchronous transmission systems.

Alternatively, a fiber-optic transmission system can implement the synchronous optical network (SONET) standard. The SONET standard defines a synchronous transport signal (STS) frame structure that includes overhead bytes and a synchronous payload envelope (SPE). One or more channels (e.g., DS1 and DS3 channels) can be mapped into a SPE. For example, a single DS3 channel can be mapped into a STS-1 frame. Alternatively, 28 DS1 channels can be mapped into virtual tributaries (VTs) within the STS-1 frame.

Various STS-1 frames can be concatenated to produce higher rate SONET signals. For example, a STS-12 signal includes 12 STS-1 frames, while a STS-48 signal includes 48 STS-1 frames. Finally, after an STS signal is converted from electrical to optical, it is known as an optical carrier (OC) signal (e.g., OC-12 and OC-48).

An end-to-end path of a provisioned channel within a network typically traverses a plurality of nodes. This provisioned channel is carrier over transmission facilities that operate at various rates in the digital signal hierarchy. For example, a provisioned DS1 channel may exist as part of a DS3, VT1.5, STS-1, STS-12, OC-12, and OC-48 signal along parts of the end-to-end path. This results due to the multiplexing and demultiplexing functions at each of the nodes.

One of the goals of a network management system is to monitor the performance of the provisioned channel. Performance of the provisioned channel can include various measures. One measure is the unavailability of the provisioned channel. Unavailability is generally defined as the amount (or fraction) of time that a channel is not operational. Various causes such as cable cuts can lead to channel downtime. Network responses to channel downtime can include automatic protection switching or various restoration procedures (e.g., digital cross-connect distributed restoration).

Although unavailability is a major performance measure from a customer's standpoint, other performance measures can also be critical. For example, if a customer desires a digital data service for the transmission of financial data, the number of errored seconds or severely errored seconds may be a concern.

In conventional network management systems, performance monitoring is accomplished in piecewise fashion. For example, consider a provisioned channel that traverses an end-to-end path comprising asynchronous transmission systems and SONET transmission systems. Performance monitoring information for these two types of transmission systems is typically maintained in separate databases. Moreover, the various types of transmission systems may be provided by multiple vendors. Each of these vendors may define their own separate performance monitoring process. For example, the vendor-controlled process may define the types of data that are retrieved from or reported by the individual network elements.

In this environment, comprehensive performance monitoring analysis is difficult to accomplish. What is needed is a network management system that can monitor provisioned channels at various points of the end-to-end path and isolate the source of the problem that is causing the observable error activity. This capability allows a service provider to proactively address potential problems in network performance, thereby minimizing the impact on the customer's perception of the quality of the provisioned service.

SUMMARY OF THE INVENTION

The present invention satisfies the above mentioned needs by providing a comprehensive network management system that can isolate a problem in the network through analysis of performance monitoring data at all levels of the digital signal hierarchy (e.g., DS-n, VT-n, STS-n, etc.). In a first embodiment of the present invention, the isolation process begins upon the receipt by a network management layer of a problem alert signal (PAS). One example of a PAS is a threshold crossing alert. A threshold crossing alert is generated when a monitored performance parameter exceeds a predefined threshold.

In a second embodiment of the present invention, the isolation process is triggered based upon a statistical analysis of reported error activity. This statistical analysis is designed to identify facility operating conditions that could lead to a significant network problem. For example, the network facility could be operating at a point near the tolerance levels. Intermittent errors could therefore result due to temporary excursions beyond the tolerance thresholds. If the statistical analysis identifies a potential problem, a raw performance monitoring PAS is generated.

Upon receipt of a PAS for a first signal transport level, the network management layer identifies whether a next highest signal transport layer in which the first signal transport level is mapped has experienced simultaneous error activity. In the first embodiment, the simultaneous error activity is identified by corresponding PASs. In the second embodiment, the simultaneous error activity is identified by non-zero error activity. This process continues until the highest signal transport layer experiencing simultaneous error activity is identified.

Next, the network management layer determines whether it has access to enough information to isolate the problem. If the network management layer does not have enough information to isolate the problem, then the highest level PAS is reported to the next highest network management layer. For example, if an element manager has performance information for only a part of an end-to-end path, the highest level PAS is reported to the network manager.

After a network management layer determines that it has access to enough information, it initiates a trouble isolation process. In the first embodiment, the network management layer determines whether the monitoring points upstream of the monitoring point that reported the first PAS have reported similar PASs. In the second embodiment, the network management layer determines whether the monitoring points upstream of the monitoring point have reported non-zero error activity. In this manner, the facility that is the originator of the error activity can be identified.

The foregoing and other features and advantages of the invention will be apparent from the following, more particular description of a preferred embodiment of the invention, as illustrated in the accompanying drawings.

BRIEF DESCRIPTION OF THE FIGURES

In the drawings, like reference numbers indicate identical or functionally similar elements. Additionally, the left-most digit of a reference number identifies the drawing in which the reference number first appears.

FIGS. 7 and 8 illustrate the monitoring points in an exemplary end-to-end path.

DETAILED DESCRIPTION OF THE PREFERRED EMBODIMENTS

The operation and administration of a service provider's network is becoming increasingly complex. Network elements continue to evolve in support of the provision of a wider range of services. The overriding goal of network management is to ensure that all aspects of the network are operating according to both the service provider's design and the customer's expectations.

A general open-ended framework is defined by the International Telecommunications Union (ITU) Telecommunications Management Network (TMN) standard. The TMN standard defines a layered framework for a service provider to implement its own network management process.

Figure 1:
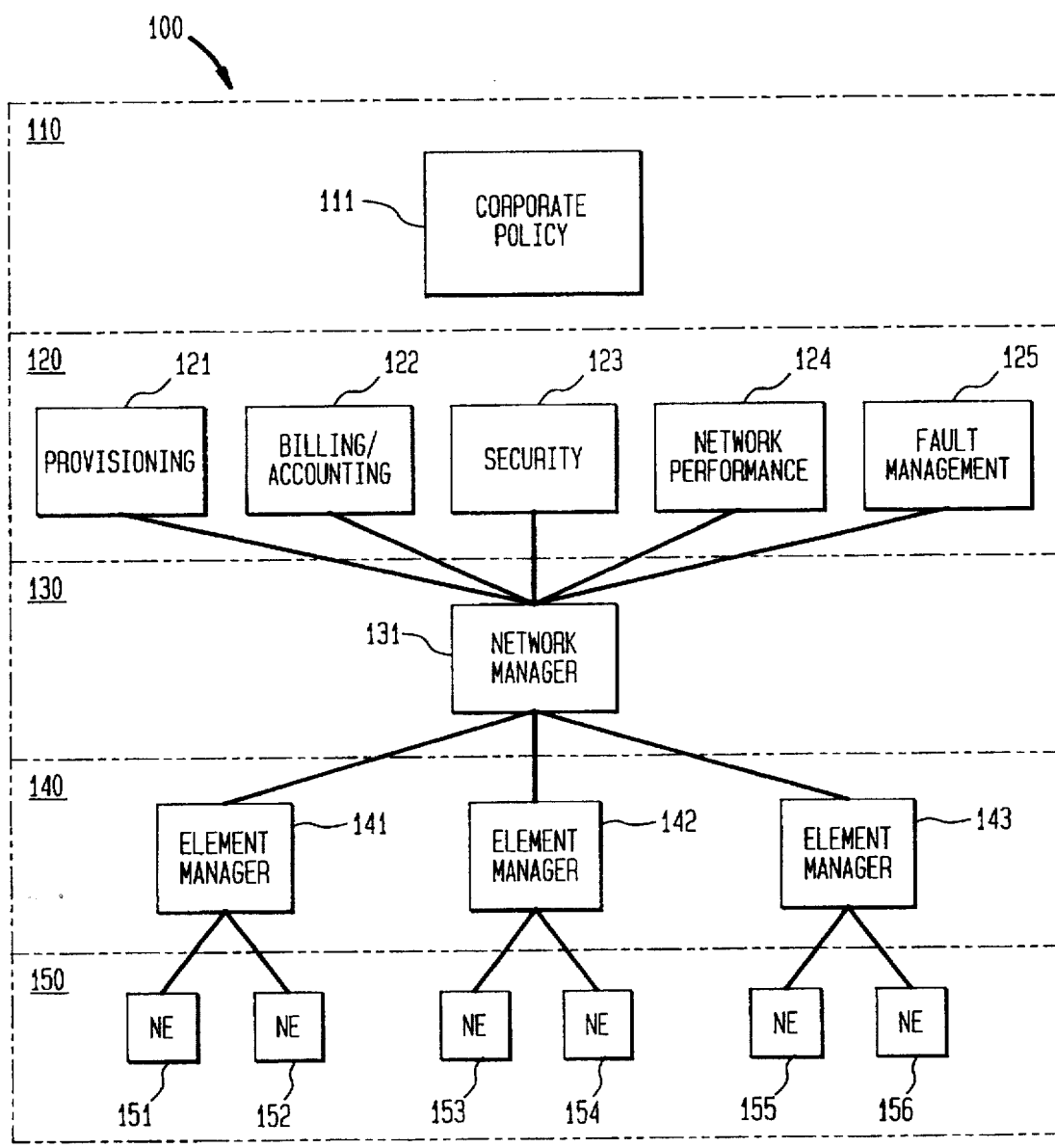
FIG. 1 illustrates the layers in a network management system.

FIG. 1 illustrates a network management system 100 that includes five layers 110, 120, 130, 140 and 150. Layer 150 is designated as the network element layer (NEL). The NEL is a physical layer that includes the various network elements (e.g., asynchronous systems, SONET systems, etc.) used in the transport and routing of network traffic (e.g., DSn, VT-n, STS-n, etc.). Each network element 151–156 in NEL 150 can be designed to provide performance monitoring, alarm and status information to the higher network management layers 110, 120, 130 and 140. In particular, network elements 151–156 are connected to one of the element managers 141–143 in element management layer (EML) 140. For example, network elements 151 and 152 are connected to element manager 141. In this manner, each network element manager 141–143 controls a portion of the physical network embodied in NEL 150.

Element managers 141–143 can retrieve information from network elements 151–156 periodically or upon a user request. Alternatively, network elements 151–156 can be programmed to provide element managers 141–143 with a predefined subset of network management information at predefined time intervals. The domain of an element manager 141–143 can be defined by the vendor. In some situations, the domain of an element manager 141–143 is dictated by the geography in which network elements 151–156 reside.

After network management information is acquired by element managers 141–143 from network elements 151–156, it is forwarded to network management layer (NML) 130. NML 130 comprises network manager 131. Network manager 131 is logically shown as a single entity. In implementation, network manager 131 can comprise one or more sites. For example, multiple service centers (not shown) can exist at different parts of the country (e.g., east coast and west coast). In combination, these national-level service centers combine to provide total visibility of the physical network in NEL 150. Network manager 131 can also be split among services and/or network elements. For example, in one embodiment, a first network manager is dedicated to asynchronous parts of the network, a second network manager is dedicated to DS1, DS3 and VT-n traffic, and a third network manager is dedicated to STS-n and OC-n traffic.

Generally, the logical entity identified as network manager 131 is a resource that is accessed by applications in service management layer (SML) 120. In FIG. 1, SML 120 is shown to include five applications 121-125. Specifically, SML 120 includes provisioning application 121, accounting/billing application 122, security application 123, network performance application 124, and fault management application 125. This listing of applications is provided without limitation. Any other application that utilizes network management data stored within NEL 150 can also be included. Note that elements of applications 121-125 also exist in EML 140 and NML 130.

Provisioning application 121 provides a customer interface for the provisioning of various services. For example, a customer can indicate a desire for a DS1 digital data service between network element 151 and network element 155. Upon receipt of this customer request, provisioning application 121 relays the provisioning commands to network manager 131. Network manager 131 then communicates with element managers 141, 143 and any other element managers that control a part of the end-to-end path to set up the DS1 connection from network elements 151-155.

Applications 122-125 can similarly support a customer interface by providing access to billing information, security information, performance information and fault management information, respectively. Each of these applications also access the resources that are stored within network manager 131.

Finally, network management system 100 also includes business management layer (BML) 110. BML 100 includes logical entity 111. Logical entity 111 represents the general corporate policy of network management system 100. Corporate policy 111 dictates the general business and contractual arrangements of the service provider.

Having identified the various layers in network management system 100, a system and method for trouble isolation is now described. Trouble isolation is generally concerned with the identification and repair of a problem in the network. Problems in the network may or may not involve actual system downtime. In other words, problems in the network may manifest themselves as degradations in system performance. An example of performance degradation includes an increase in the bit error rate (BER). Bit errors are typically measured in terms of errored seconds (ESs) and severely errored seconds (SESs). An unacceptable increase in the BER of the provisioned channel may prove unsatisfactory to the customer. In many instances, customer expectations of performance of a provisioned channel are defined by the requirements contained within a service contract. The service contract may correlate system performance to the tariffing structure. If the number of ESs, SESs or unavailability of the service becomes excessive, customer rebates may be in order.

In a competitive business climate, it is desirable for a service provider to quickly identify and repair problems leading to system downtime or degradation. Problems that cannot be pinpointed will continue to affect system performance and a customer's perceptions. The present invention provides a system and method for isolating network problems using a comprehensive approach. This comprehensive approach uses the information stored in one or more layers of network management system 100 to isolate the network problem.

Figure 2:
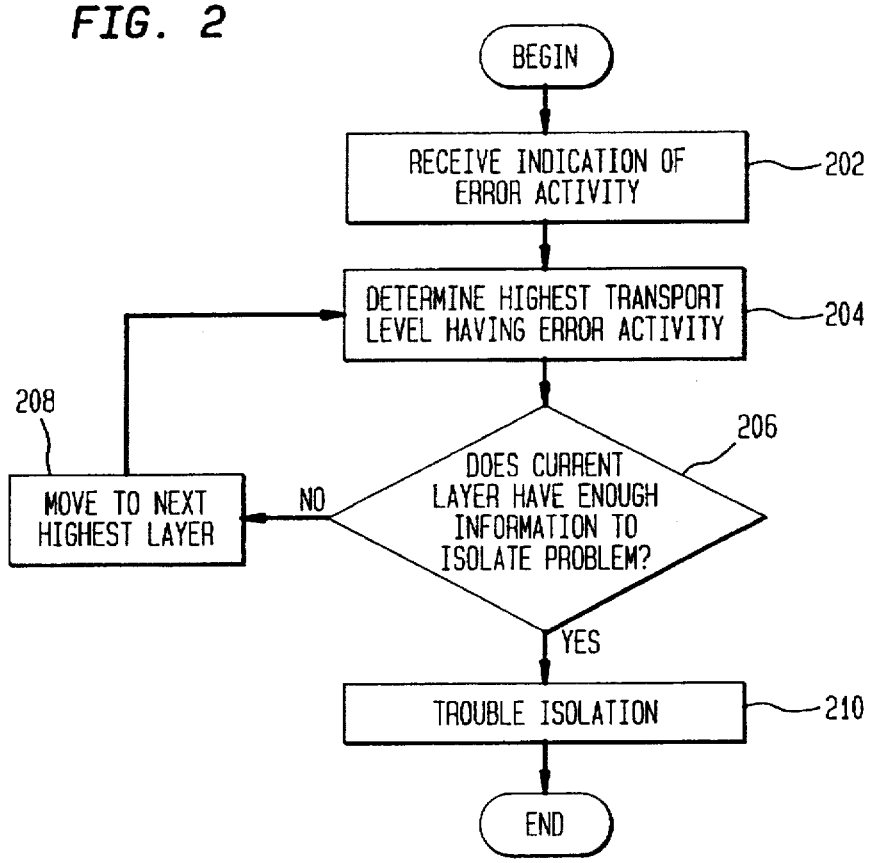
FIGS. 2 and 4–6 illustrate flow charts of the trouble isolation process according to the present invention.

FIG. 2 illustrates a flow chart of a first embodiment of the trouble isolation process. The trouble isolation process begins at step 202 where error activity is reported to network management system 100. More specifically, error activity is first reported to one or more element managers 141-143 in EML 140 by monitoring points associated with network elements 151-156. Monitoring points are described in greater detail below.

For example, consider element manager 141. Over a period of time, a monitoring point associated with network element 151 may observe an excessive number of ESs on a received channel. If the monitoring point determines that the number of ESs exceeds a predefined threshold value, a threshold crossing alert is reported to element manager 141. Any other statistical analysis by the monitoring point can also cause the monitoring point to report the existence of error activity. In the remainder of the description, problem alert signals (PASs) will be used to describe the general class of reported error activity.

Once a PAS is generated, the trouble isolation process continues to step 204. At step 204, element manager 141 in EML 140 determines the highest transport level that has simultaneous error activity. For example, assume that element manager 141 observes an excessive number of ESs on a DS1 channel. This problem may be a manifestation of a problem in a higher transport level (i.e., DS3, STS-n, etc.). Isolating the actual network problem involves a determination of the facility that is causing the problem. The facility may operate at any level in the digital signal hierarchy that includes the DS1 channel as a component.

Generally, when error activity is detected at a particular digital transport level, the correlation of that error activity to other error activity within the digital transport level hierarchy is not a simple matter. For example, error activity detected at the DS3 level may not be detected at the STS-48 level. This may result due to the insufficient granularity of the error detection at the higher STS-48 level. An error at the STS-48 level may affect some or all of the lower transport levels within the STS-48 signal depending on the severity and the distribution of the error event. For example, bursty errors may affect only some of the lower transport levels while a continuous error may affect all lower transport levels. For this reason, performance monitoring data is collected at different hierarchial signal transport levels and error activity is correlated between the different signal transport levels. This correlation process allows network management system 100 to isolate the error source to activity in a segment of the end-to-end path having a higher signal transport level.

FIGS. 3A-3D illustrate the transport level determination process of step 204. For the example of a DS1 level path PAS, the transport level determination process begins at step 302 of FIG. 3A. At step 302, element manager 141 determines whether the DS1 channel is mapped into a DS3 channel or into a VT-1.5 channel. If the DS1 channel is mapped into a DS3 channel, the process continues at step 306. At step 306, element manager 141 determines whether the DS3 in which the DS1 is mapped has reported a PAS. In other words, element manager 141 determines whether the DS3 in which the DS1 is mapped has simultaneous error activity occurring.

In a similar manner to step 306, step 308 is invoked if element manager 141 determines, at step 302, that the DS1 is mapped into a VT-1.5 channel. At step 308, element manager 141 determines whether the VT-1.5 in which the DS1 is mapped has reported a PAS. Again, element manager 141 determines whether the VT-1.5 has simultaneous error activity occurring.

If the determination at either step 304 or step 306 determines that the VT1.5 or DS3, respectively, has not reported a PAS, then element manager 141 reports the DS1 path PAS to network manager 131 in NML 130. Next, at step 310, the highest transport level is identified as a DS1 and the process ends.

Figure 3A:
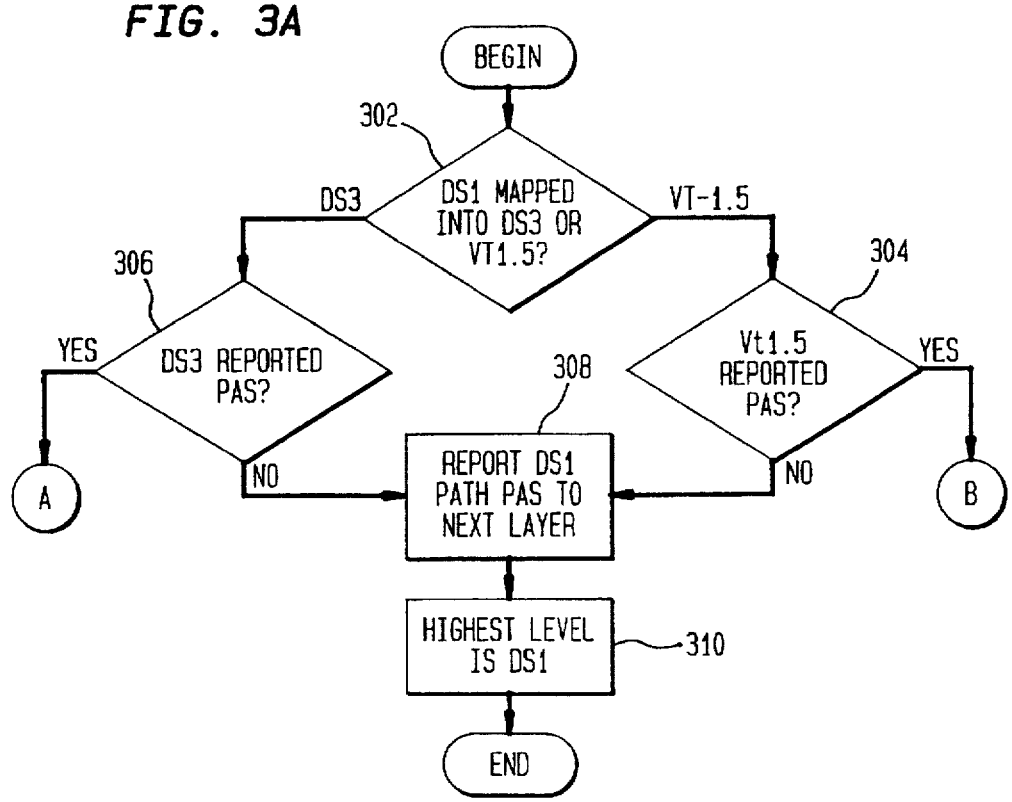
FIGS. 3A–3D and 11A–11D illustrate flow charts of the process of determining a highest transport level having simultaneous error activity.
Figure 3B:
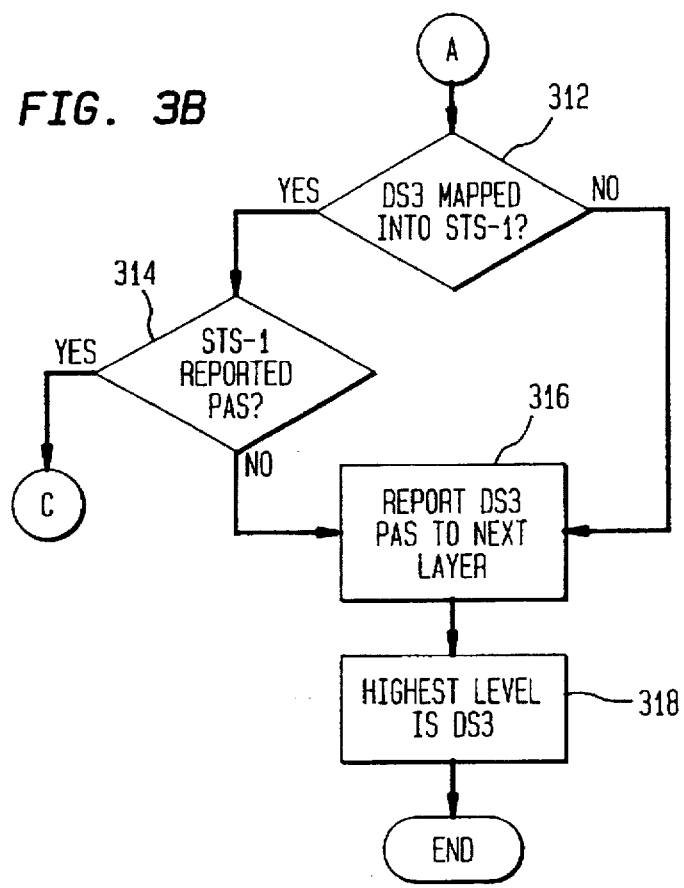

Returning to step 306, if the DS3 in which the DS1 is mapped does report a PAS, the process continues to step 312 of FIG. 3B. At step 312, element manager 141 determines whether the DS3 is mapped into a STS-1. If the DS3 is not mapped into an STS-1, the DS3 PAS is reported to network manager 131 at step 316. Thereafter, the highest transport level is identified as a DS3. If element manager 141 determines, at step 314, that the DS3 is mapped into an STS-1, element manager 141 then determines whether the STS-1 has reported a PAS (i.e., simultaneous error activity). If a STS-1 PAS was not reported, the DS3 PAS is reported to network manager 131.

Figure 3C:
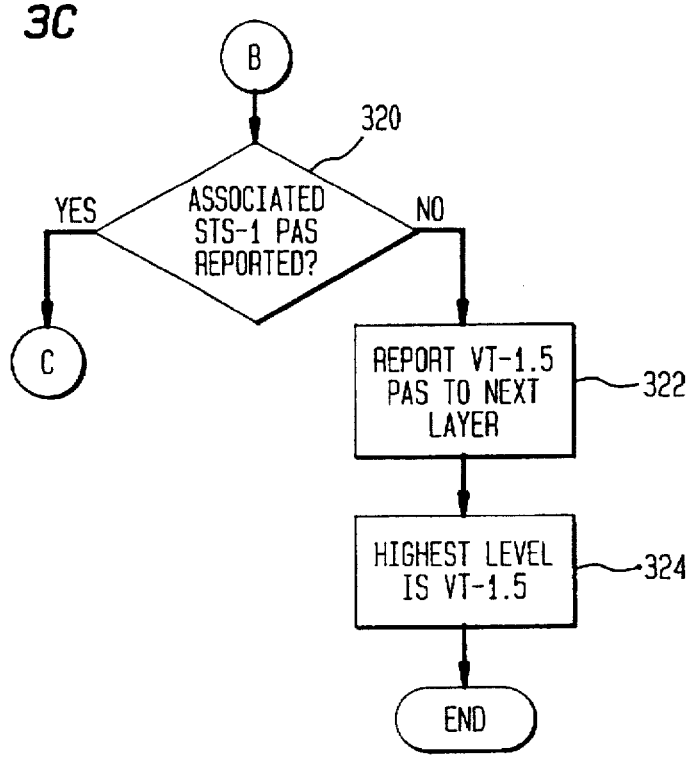

Returning to step 304, if the VT-1.5 in which the DS1 is mapped does report a PAS, the process continues to step 320 of FIG. 3C. At step 320, element manager 141 determines whether the STS-1 in which the VT-1.5 is mapped has reported a PAS. Here, no determination is made as to whether the VT-1.5 is mapped into a STS-1. This results because a VT-1.5 channel cannot exist in the network independently of a STS-1 channel. If the associated STS-1 in which the VT-1.5 is mapped has not reported a PAS, the VT-1.5 path PAS is reported to network manager 131 at step 322. Next, the highest transport level is identified as a VT-1.5 channel at step 324.

Figure 3D:
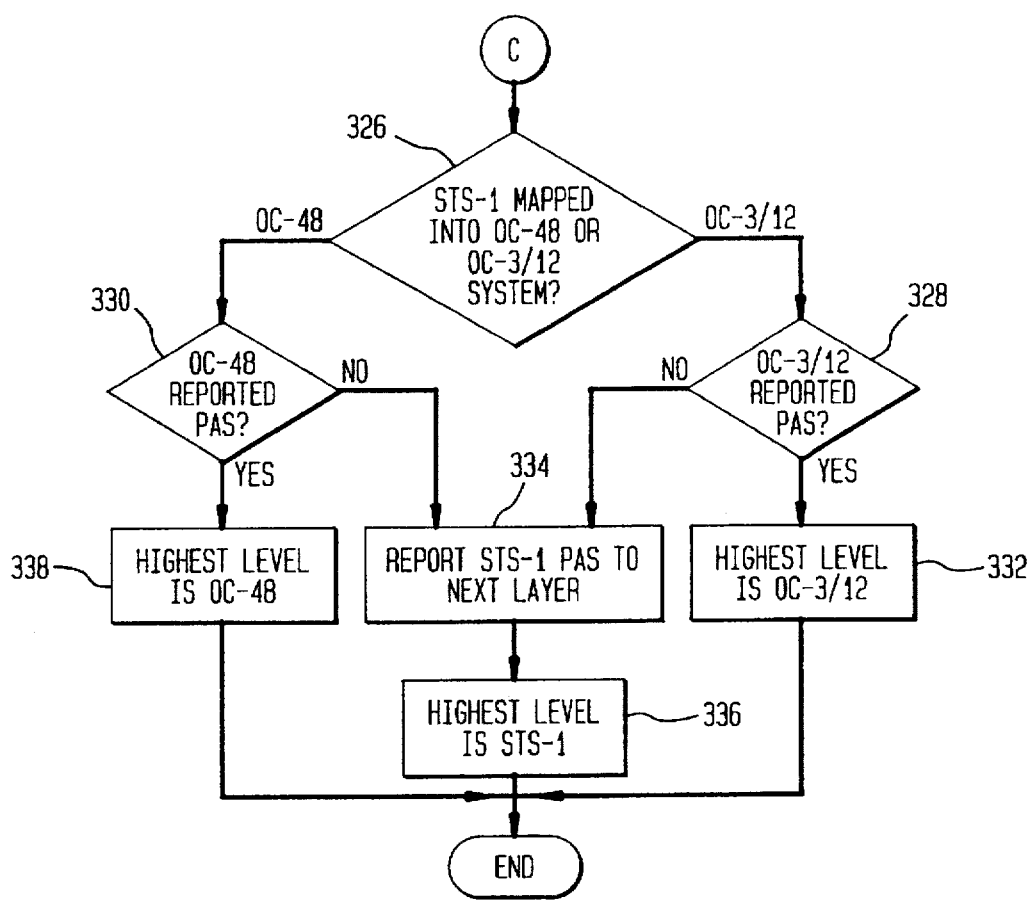

If element manager 141 determines at either step 314 or step 320 that a STS-1 has reported a PAS, the process continues at step 326 of FIG. 3D. At step 326, element manager 141 determines whether the STS-1 is mapped into an OC-48 system or an OC-3/12 system. An OC-48 system is generally used to transport STS-1s between two nodes in the network. An OC-3 or OC-12 system, on the other hand, is generally used to transport STS-1s between network elements within a particular node. For example, an OC-3 or OC-12 fiber optic link could be used to transport STS-1s between an OC-48 line terminating equipment (LTE) and a broadband digital cross-connect system (BBDCS).

If element manager 141 determines at step 326 that the STS-1 is mapped into an OC-3/12 system, element manager 141 then determines, at step 328, whether the OC-3/12 system has reported a PAS. If the OC-3/12 system has reported a PAS, the highest transport level is identified as a OC-3/12 at step 332. Conversely, if the OC-3/12 system has not reported a PAS, a STS-1 PAS is reported to network manager 131 at step 334. Next, the highest transport level is identified as a STS-1 at step 336.

If element manager 141 determines at step 326 that the STS-1 is mapped into an OC-48 system, element manager 141 then determines, at step 330, whether the OC-48 system has reported a PAS. If the OC-48 system has reported a PAS, the highest transport level is identified as a OC-48 at step 338. Conversely, if the OC-48 system has not reported a PAS, a STS-1 PAS is reported to network manager 131 at step 334. In this case, the highest transport level is identified as a STS-1 at step 336.

As the flow chart of FIGS. 3A–3D illustrate, the present invention seeks to identify the highest transport level that is experiencing simultaneous error activity. Note that while all non-zero error activity is reported to the higher network management layers, only the highest level path PAS is forwarded to NML 130. This reduces the amount of trouble isolation processing that occurs at NML 130. Generally, the identification of the highest level path PAS allows network management system 100 to identify the true source of the network error activity. Note also that the identification process of FIGS. 3A–3D need not begin at the DS1 level. For example, the identification process could begin at step 312 after a DS3 PAS is reported.

Returning to FIG. 2, after the highest transport level having simultaneous error activity (i.e., reported a PAS) has been identified at step 204, the process continues to step 206. At step 206, element manager 141 determines whether it has enough information to isolate the network problem.

Recall that each element manager 141–143 has access to network management information received from a subset of network elements 151–156. If the reported PAS was caused by a problem outside of an element manager's domain, then that particular element manager cannot isolate the problem. Various sequences of decisions are used by each element manager 141–143 to determine if a problem can be isolated.

For example, consider the reported performance parameter of severely errored seconds (SESs). SESs can be classified into two types, line SESs (SESL) and path SESs (SESP). If a PAS is triggered based upon an excessive number of SESLs, then the element manager knows that the problem is local. Assuming that both ends of the line reside in the element manager's domain, the element manager can conclude that the network problem can be isolated.

If a PAS is triggered based upon an excessive number of SESPs, then the element manager knows that the network problem may not necessarily reside in the element manager's domain. An additional determination must be made as to whether the originating and terminating network elements reside in the element manager's domain. If both reside in the element manager's domain, then the element manager knows that it can isolate the network problem.

As would be apparent to one of ordinary skill in the relevant art, implementation dependent decision trees can be designed to determine whether a network problem can be isolated based upon a specific type of PAS. If an element manager 141–143 determines that it does not have enough information to isolate the network problem, the isolation process is performed at the next highest layer in network management system 100 (i.e., NML 130). Note that network manager 131 of NML 130 begins the isolation process as soon as a PAS is received from one of element managers 141–143.

Once control passes to NML 130, network manager 131 would similarly determine a highest transport level having simultaneous error activity and proceed to step 206. At step 206, network manager 131 would similarly determine whether it has enough information to isolate the problem.

Figure 4:
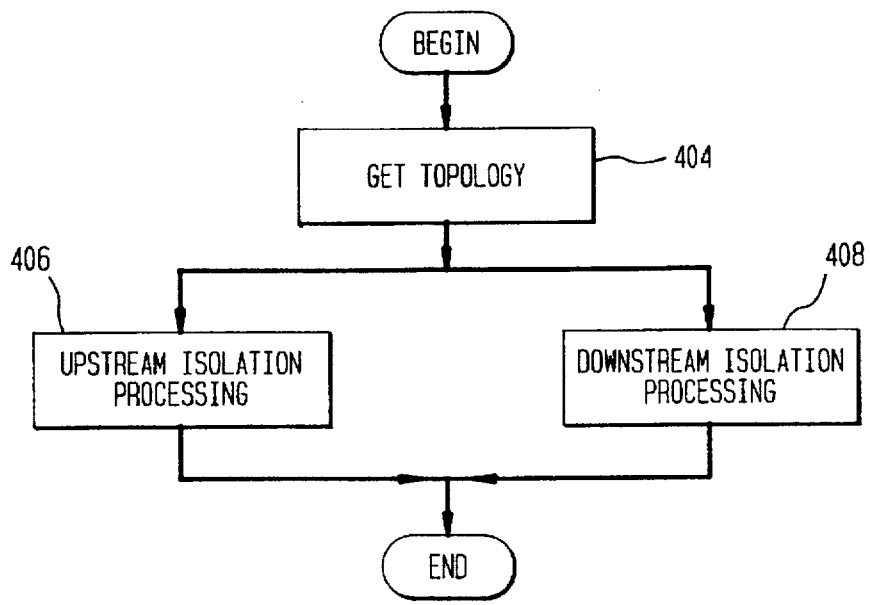

After either EML 140, NML 130 or SML 120 determines that it has enough information to isolate the problem, the process continues at step 210. The trouble isolation process of step 210 is described with reference to FIGS. 4–6.

In this description, assume that network manager 131 has enough information to isolate the problem. After a highest transport level PAS is identified at step 204 of FIG. 2, network manager 131 retrieves, at step 404, the topology of the end-to-end path of the provisioned channel in which the PAS was reported. Note that the topology may have previously been retrieved by an earlier process that determined whether network manager 131 could, in fact, isolate the problem.

After the topology is retrieved, upstream and downstream isolation processing begin at steps 406 and 408, respectively. Generally, upstream isolation processing attempts to find the network element that is the source of the PAS. Downstream processing, on the other hand, identifies related downstream reported PASs and stops further processing for those PASs. Both upstream and downstream isolation processing include the analysis of the monitoring points in the end-to-end path of the provisioned channel that reported the PAS.

Monitoring points are described in detail in copending applications "Monitor Point Identification", filed Jun. 28, 1996, Ser. No. 08/672,512, "Service Management Layer Threshold Setting", filed Jun. 28, 1996, Ser. No. 08/670,845, and "Monitor Point Activation", filed Jun. 28, 1996, Ser. No. 08/672,356. Generally, monitoring points are labeled as either primary monitoring points (PMPs) or secondary monitoring points (SMPs). These concepts are described with reference to the end-to-end path of FIG. 7. FIG. 7 illustrates a hybrid asynchronous/SONET DS3 monitoring configuration. In this exemplary end-to-end path, a DS3 traverses, in sequence from left-to-right, DS3 co-axial cable patch panel (DSX-3) 704, asynchronous line terminating equipment (ALTE) 706 and 708, digital cross-connect (DXC) 710, SONET broadband DXC 712, SONET line terminating equipment (SLTE) 714 and 716, BBDXC 718, and SONET wideband DXC (WBDXC) 720.

A basic monitoring point strategy for a generic end-to-end path includes monitoring points nearest to the facility end points. Monitoring points nearest to the facility end points are designated as PMPs. A facility end point can be thought of as a generic customer termination point (e.g., handoff point to a business, local exchange carrier (LEC), etc.). At a particular office, more than one type of device can extract performance monitoring information. For this reason, a network element or monitoring unit is labeled PA, PB, PC, etc. to identify an order of preference of possible PMP locations. Consider the example of FIG. 7. In this example, WBDXC 720 is labeled as PA, BBDXC 718 is labeled as PB and SLTE 716 is labeled as PC. By this labeling process, the highest preference is given to the network element that is nearest to the handoff point.

In addition to the PMPs, a provisioned channel may also include SMPs. SMPs are intermediate performance monitoring data collection points. SMPs allow network management system 100 to isolate a network problem by providing performance monitoring information at intermediate sections of the end-to-end path. FIG. 8 illustrates SMPs 811–814 that can exist within the line defined by SLTEs 714 and 716. In this example, SMP 811 is associated with SLTE 714, SMP 812 is associated with section terminating equipment (STE) 802, SMP 813 is associated with STE 804, and SMP 814 is associated with SLTE 716. STEs 802 and 804 extract the section overhead of the SPE in the OC-48 signal.

A simple example of trouble isolation is described with reference to sections B1-B3 of FIG. 8. In this example, assume that SMP 814 identifies 10 ESs. If SMPs 812 and 813 identify zero errored seconds, then the error source is within section B3.

Figure 5:
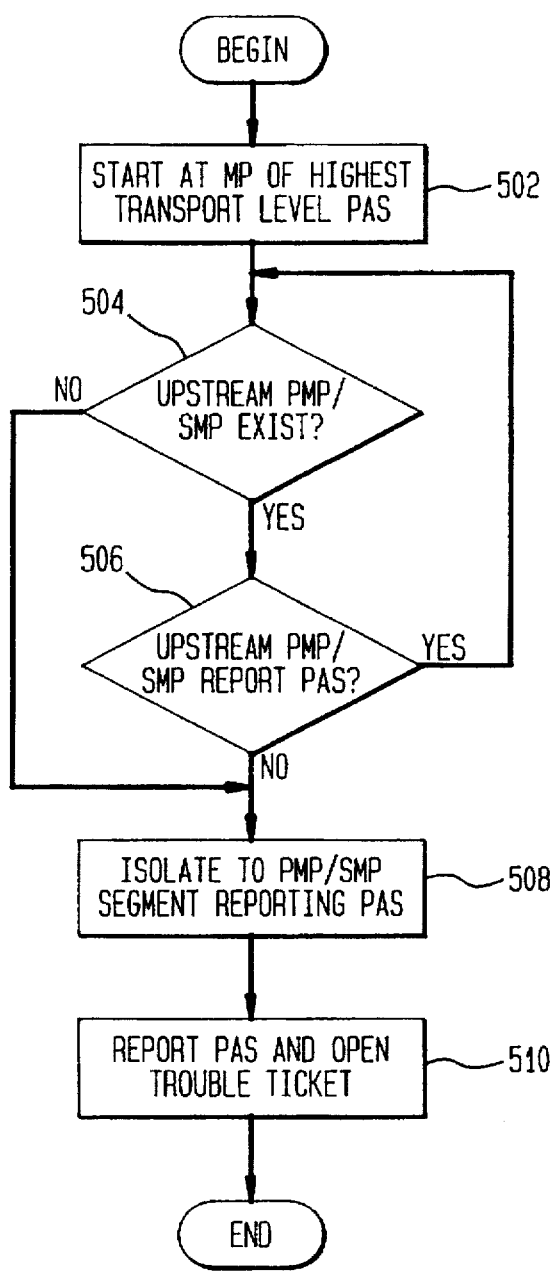

The general upstream isolation process is illustrated in FIG. 5. In the following description, it is assumed that the upstream isolation process is performed by network manager 131 in NML 130. It should be noted that the upstream isolation process could also occur in EML 150 or SML 130.

As illustrated in step 502 of FIG. 5, the upstream isolation process begins at the monitoring point reporting the highest transport level PAS. Note that the PASs need not be received in a particular order. In other words, the first PAS that is received by network manger 131 may exist in the middle of the path entity or line entity of the provisioned channel. For example, consider the exemplary path topology of FIG. 7. DS3 path PASs can be generated by DS3 monitoring trait (DS3MU) 702. Additionally, DS3 path PASs can be generated by further DS3MUs (not shown) that are provisioned along the end-to-end path. The various DS3 path PASs can be received from the plurality of DS3MUs in an arbitrary order. Similarly, for a VT-n, STS-1 or STS-Nc (e.g., STS-3c) channel that is provisioned across the network, a plurality of intermediate SONET network elements could be configured to report VT-n, STS-1 or STS-Nc path PASs. Again, the path PASs are received by a layer in network management system 100 in an arbitrary order. With respect to line entities (e.g., STS-48 signal transport level), consider the example of FIG. 8. In this context, line or section PASs can be generated by any of SMPs 811–814 and reported to a layer in network management system 100 in an arbitrary order.

For this reason, at step 504, network manager 131 determines whether a PMP or SMP exists upstream of the monitoring point that generated the highest transport level PAS. If a path PAS is being considered, all upstream monitoring points are analyzed, whereas if a line or section PAS is being considered, only the upstream monitoring points within a line entity are analyzed.

Generally, if an upstream PMP or SMP exists, network manager 131 determines, at step 506, whether the upstream PMP or SMP has reported a PAS that corresponds to the initial PAS. If the PASs correspond to each other, network manager 131 knows that the problem is caused by a problem further upstream. The isolation process continues until the furthest upstream monitoring point reporting a corresponding PAS is identified. If network manager 131 determines that an upstream PMP or SMP does not exist, or determines that an upstream PMP or SMP has not reported a corresponding PAS, then the problem is isolated to the furthest upstream PMP or SMP segment that reported the PAS. This is illustrated by step 508. Finally, at step 510, network manager 131 reports the furthest upstream PAS and opens a trouble ticket for service personnel dispatch.

Figure 6:
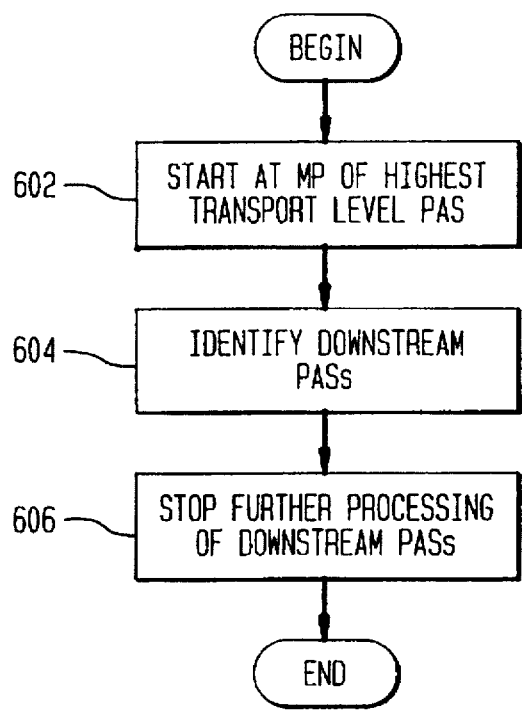

At the same time network manager 131 is carrying out the upstream isolation process, the downstream isolation process is also started as shown in step 602 of FIG. 6. The downstream isolation process also begins at the monitoring point that reported the highest transport level PAS. Next, at step 604, network manager 131 identifies all corresponding downstream PASs. At step 606, network manager 131 stops further processing on each of the corresponding downstream PASs. Further processing of the corresponding downstream PASs is unnecessary because the network problem identified by the downstream PASs has already been addressed through the processing of the upstream PASs. Note again that if a path PAS is being considered, all downstream monitoring points are analyzed, whereas if a line or section PAS is being considered, only the downstream monitoring points within a line entity are analyzed.

Figure 10:
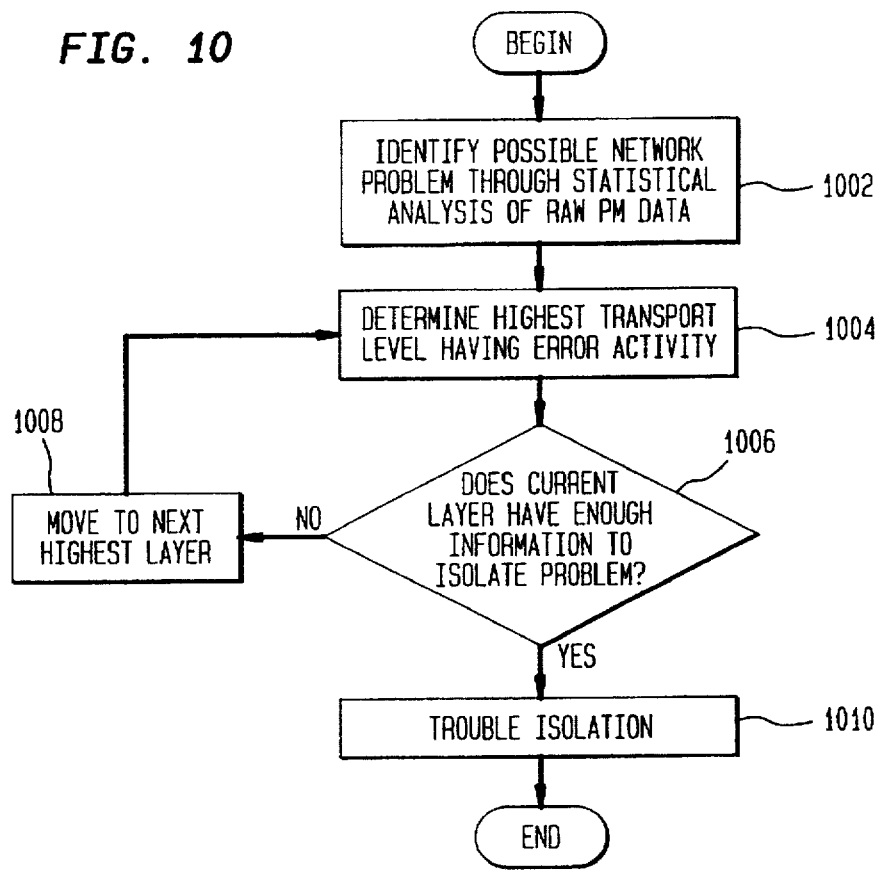
FIGS. 10 and 12–14 illustrate flow charts of the unreported trouble isolation process according to the present invention.

FIG. 10 illustrates a flow chart of a second embodiment of the trouble isolation process. This unreported trouble isolation process begins at step 1002 where a layer in network management system 100 identifies the existence of a possible network problem through the analysis of raw performance monitoring (PM) data. In this second embodiment, it is assumed that the raw PM data being analyzed did not cause a monitoring point to report a PAS. Rather, a layer in network management system 100 analyzes the appearance of non-zero error activity over a period of time. This period of time could represent a number of days or weeks.

One goal of raw PM data analysis is to identify network problems at the earliest possible stage. In other words, it is desirable for a service provider to identify a potential network problem before any significant effects are felt by the customer. In this manner, the service provider is able to correct a problem before the customer is aware that a problem exists.

One example of a potential problem is the existence of "dribble" errors. In this context, dribble errors are used to refer to a situation where a system is operating satisfactorily but not error-free. Errors that are reported by the monitoring points to a layer in network management system 100 are typically not large enough to cause a monitoring point to declare a PAS. Ordinarily, these nonzero error reports would not prompt any action by a service provider. However, these non-zero errors could indicate that a network element is operating at a point near the acceptable tolerance levels. Numerous examples exist. Intermittent errors could simply be caused by a dirty connector in a fiber-optic link. In other cases, synchronization shifts could cause jitter tolerance levels to be exceeded. In other examples, temperature or humidity variations could cause network element performance to periodically degrade.

Regardless of the cause, intermittent non-zero error reports will be provided to a layer in network management system 100. Each layer in network management system 100 can independently analyze the existence of non-zero error activity over a period of time. Experience in the analysis of the non-zero error activity can lead to a correlation between specific patterns of error activity with the existence of specific network problems. Any means of statistical analysis can be used as a means for triggering the trouble isolation process. For example, if specific patterns of error activity are known to lead to certain failures, general pattern recognition systems (e.g., neural networks) can be used for triggering purposes. As noted above, this statistical analysis can be performed at each of network management layers 120, 130, and 140 simultaneously. The only difference in processing is the scope of PM data that is available to an element in the particular layer in network management system 100.

After a a layer in network management system 100 identifies the existence of a potential network problem, the unreported trouble isolation process continues to step 1004. At step 1004, the network management layer determines the highest transport level that has raw PM data indicating simultaneous error activity. Note that the raw PM data at the highest transport level may not have been sufficient to trigger the unreported trouble isolation process. Rather, the granularity of the raw PM data at the lower transport level allows the network management layer to attribute the potential network problem to a higher transport level facility.

FIGS. 11A–11D illustrate the transport level determination process of step 1004. For the example of a statistical trigger based on raw PM data for a DS1 channel, the transport level determination process begins at step 1102 of FIG. 3A. In this example, assume that the unreported trouble analysis process is being performed by element manager 141.

At step 1102, element manager 141 determines whether the DS1 channel is mapped into a DS3 channel or into a VT-1.5 channel. If the DS1 channel is mapped into a DS3 channel, the process continues at step 1106. At step 1106, element manager 141 determines whether the DS3 in which the DS1 is mapped has reported non-zero error activity. In a similar manner to step 1106, step 1108 is invoked if element manager 141 determines, at step 1102, that the DS1 is mapped into a VT-1.5 channel. At step 1108, element manager 141 determines whether the VT-1.5 in which the DS1 is mapped has reported non-zero error activity. In the simplest example for either scenario, element manager 141 determines whether non-zero error activity has been recorded for the same monitored parameter identified in the original statistical analysis.

If the determination at either step 1104 or step 1106 determines that the VT-1.5 or DS3, respectively, has not reported non-zero error activity, then element manager 141, at step 1108, reports the DS1 raw PM PAS to network manager 131 in NML 130. Next, at step 1110, the highest transport level is identified as a DS1 and the process ends.

Figure 11A:
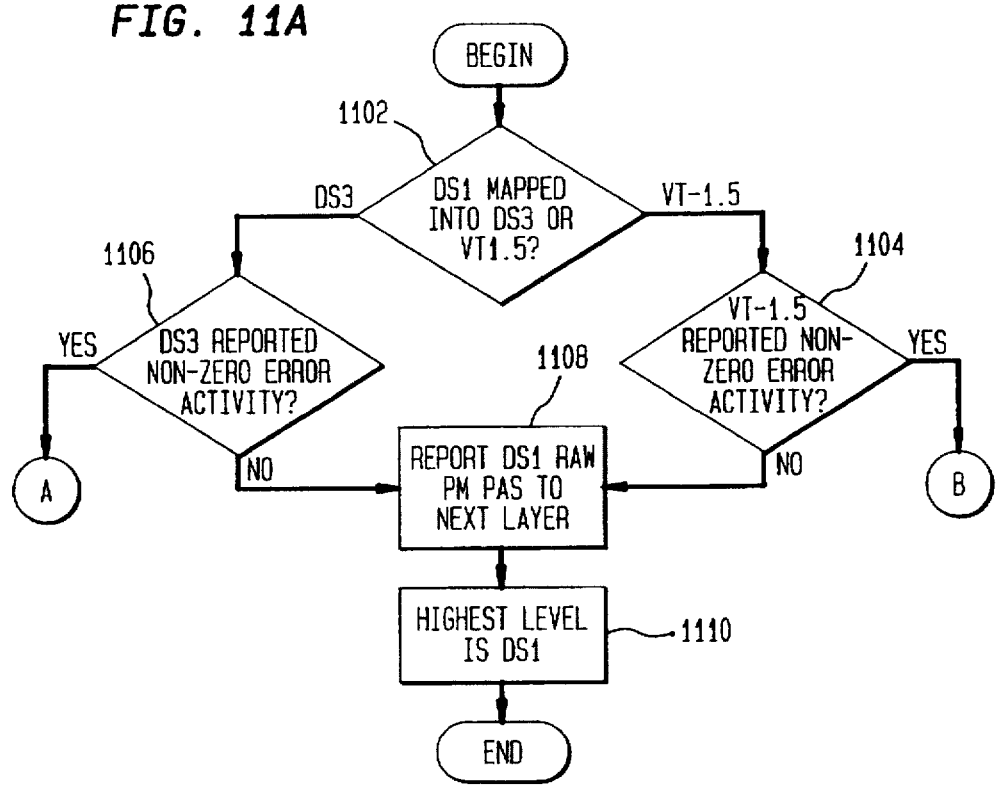
Figure 11B:
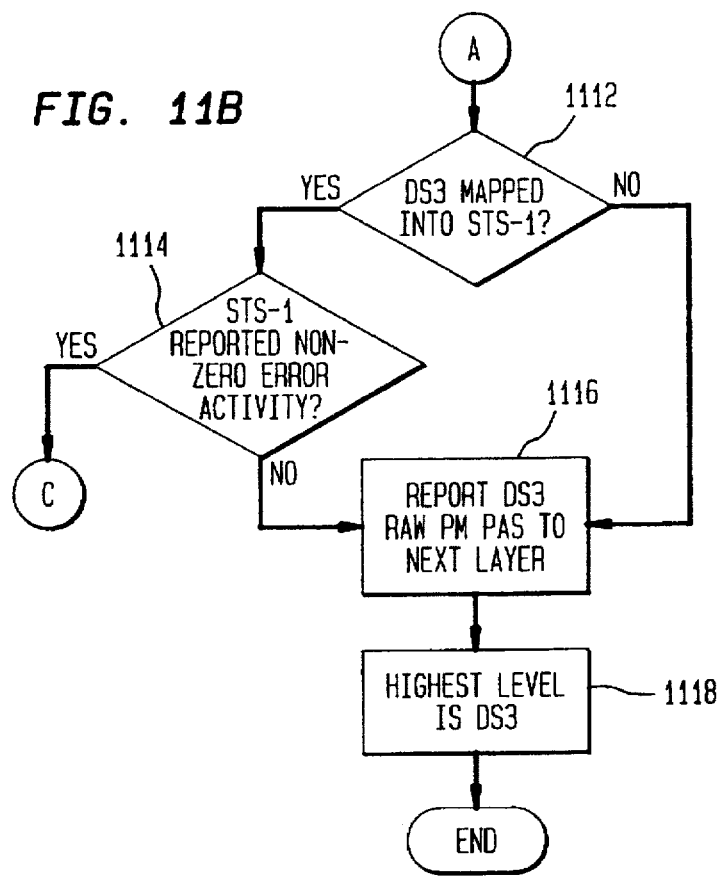

Returning to step 1106, if the DS3 in which the DS1 is mapped does report non-zero error activity, the process continues to step 1112 of FIG. 11B. At step 1112, element manager 141 determines whether the DS3 is mapped into a STS-1. If the DS3 is not mapped into an STS-1, the DS3 raw PM PAS is reported to network manager 131 at step 1116. Thereafter, the highest transport level is identified as a DS3 at step 1118. If element manager 141 determines, at step 1114, that the DS3 is mapped into an STS-1, element manager 141 then determines whether the STS-1 has reported non-zero error activity at step 1114. If non-zero error activity was not reported, the DS3 raw PM PAS is reported to network manager 131.

Figure 11C:
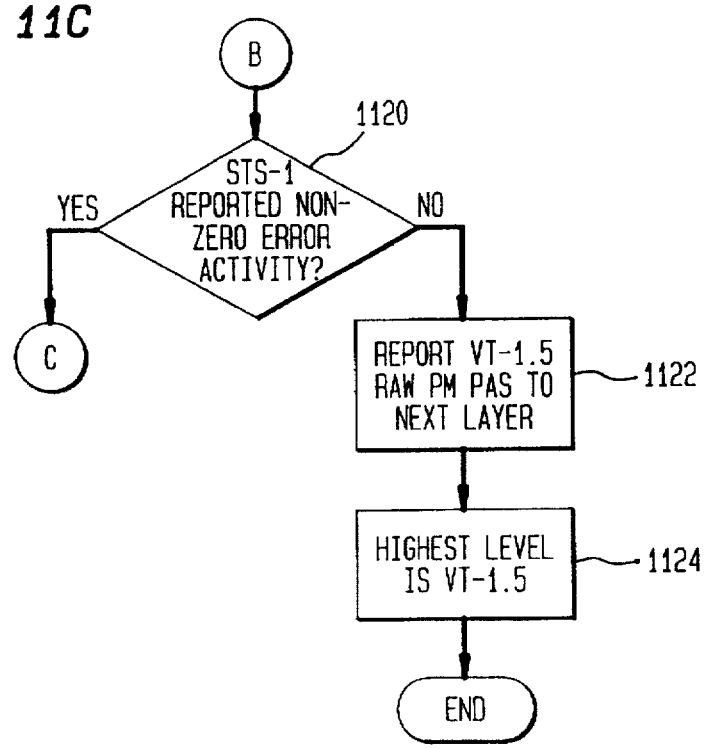

Returning to step 1104, if the VT-1.5 in which the DS1 is mapped does report non-zero error activity, the process continues to step 1120 of FIG. 11C. At step 1120, element manager 141 determines whether the STS-1 in which the VT-1.5 is mapped has reported non-zero error activity. If the associated STS-1 in which the VT-1.5 is mapped has not reported non-zero error activity, the VT1.5 raw PM PAS is reported to network manager 131 at step 1122. Next, the highest transport level is identified as a VT-1.5 channel at step 1124.

Figure 11D:
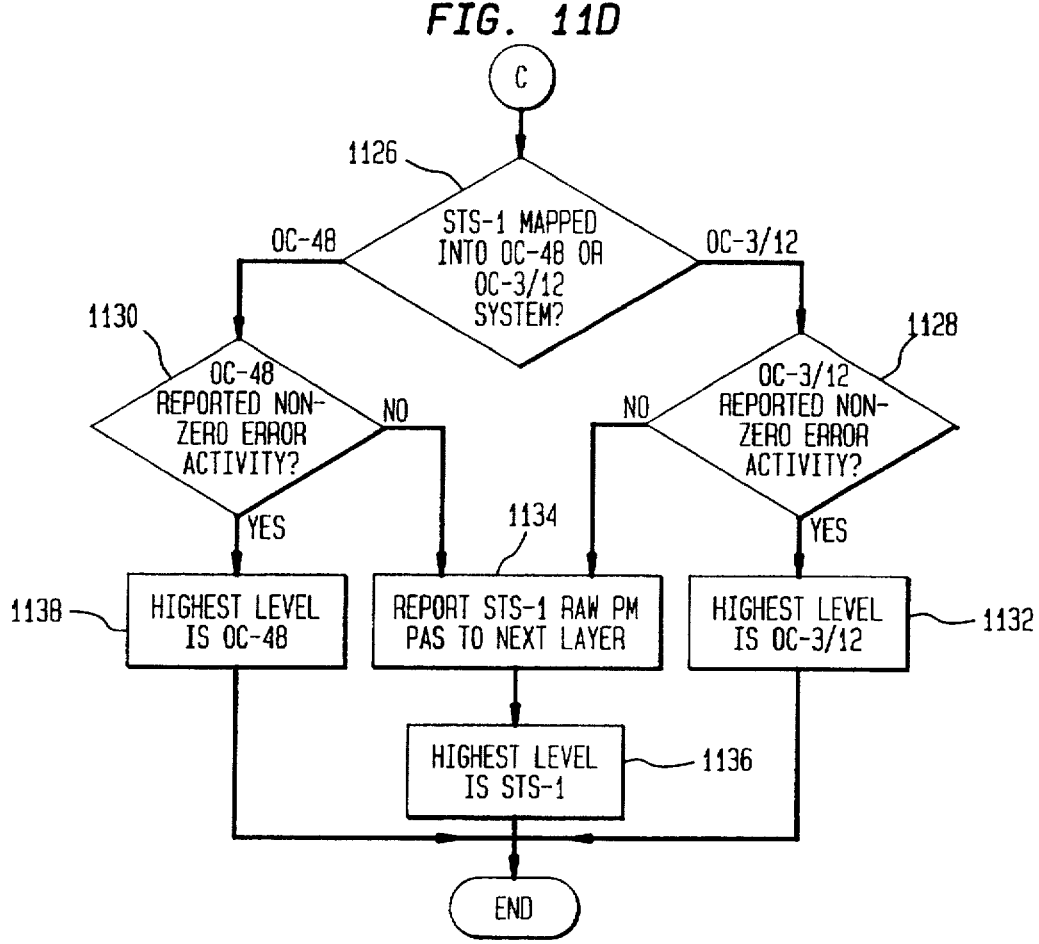

If element manager 141 determines at either step 1114 or step 1120 that a STS-1 has reported non-zero error activity, the process continues at step 1126 of FIG. 11D. At step 1126, element manager 141 determines whether the STS-1 is mapped into an OC-48 system or an OC-3/12 system. If element manager 141 determines at step 1126 that the STS-1 is mapped into an OC-3/12 system, element manager 141 then determines, at step 1128, whether the OC-3/12 system has reported non-zero error activity. If the OC-3/12 system has reported non-zero error activity, the highest transport level is identified as a OC-3/12 at step 1132. Conversely, if the OC-3/12 system has not reported non-zero error activity, a STS-1 raw PM PAS is reported to network manager 131 at step 1134. The highest transport level is then identified as a STS-1 at step 1136.

If element manager 141 determines at step 1126 that the STS-1 is mapped into an OC-48 system, element manager 141 then determines, at step 1130, whether the OC-48 system has reported non-zero error activity. If the OC-48 system has reported non-zero error activity, the highest transport level is identified as a OC-48 at step 1138. Conversely, if the OC-48 system has not reported non-zero error activity, a STS-1 raw PM PAS is reported to network manager 131 at step 1134. In this case, the highest transport level is identified as a STS-1 at step 1136.

As the flow chart of FIGS. 11A–11D illustrate, the present invention seeks to identify the highest transport level that is experiencing simultaneous error activity. Note that the identification process of FIGS. 11A–11D need not begin at the DS1 level. For example, the statistical analysis could identify a potential problem at the DS3 level. In this case, the process described in FIGS. 11A–11D begins at step 1112.

Figure 12:
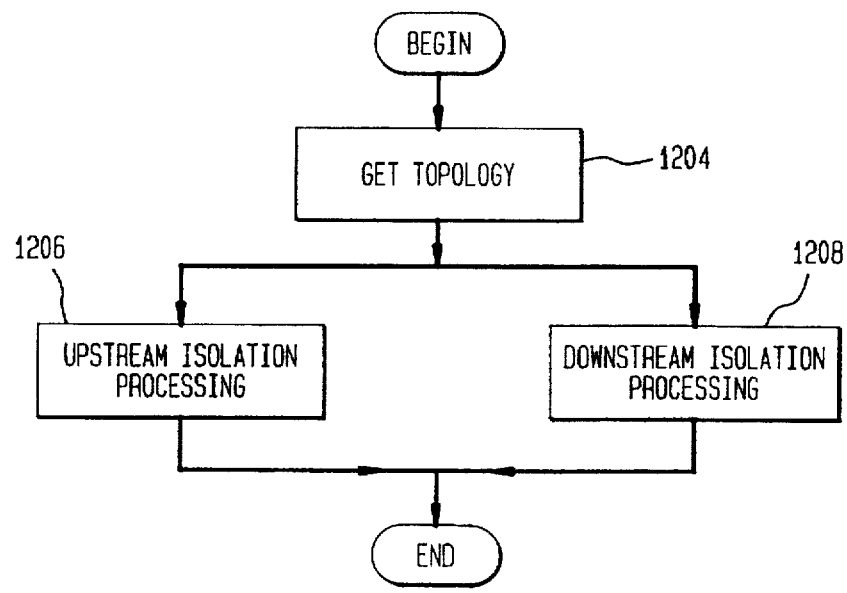

Returning to FIG. 10, after the highest transport level having simultaneous error activity has been identified at step 1004, the process continues to step 1006. At step 1006, element manager 141 determines whether it has enough information to isolate the network problem. If element manager 141 determines that it has enough information to isolate the problem, the process continues to the trouble isolation process of step 1010. The trouble isolation process of step 1010 is described with reference to FIGS. 12–14.

In this description, assume that network manager 131 has enough information to isolate the problem. After a highest transport level raw PM PAS is identified at step 1004 of FIG. 10, network manager 131 retrieves, at step 1204, the topology of the end-to-end path of the provisioned channel in which the raw PM PAS was reported. Note that the topology may have previously been retrieved by an earlier process that determined whether network manager 131 could, in fact, isolate the problem.

Figure 13:
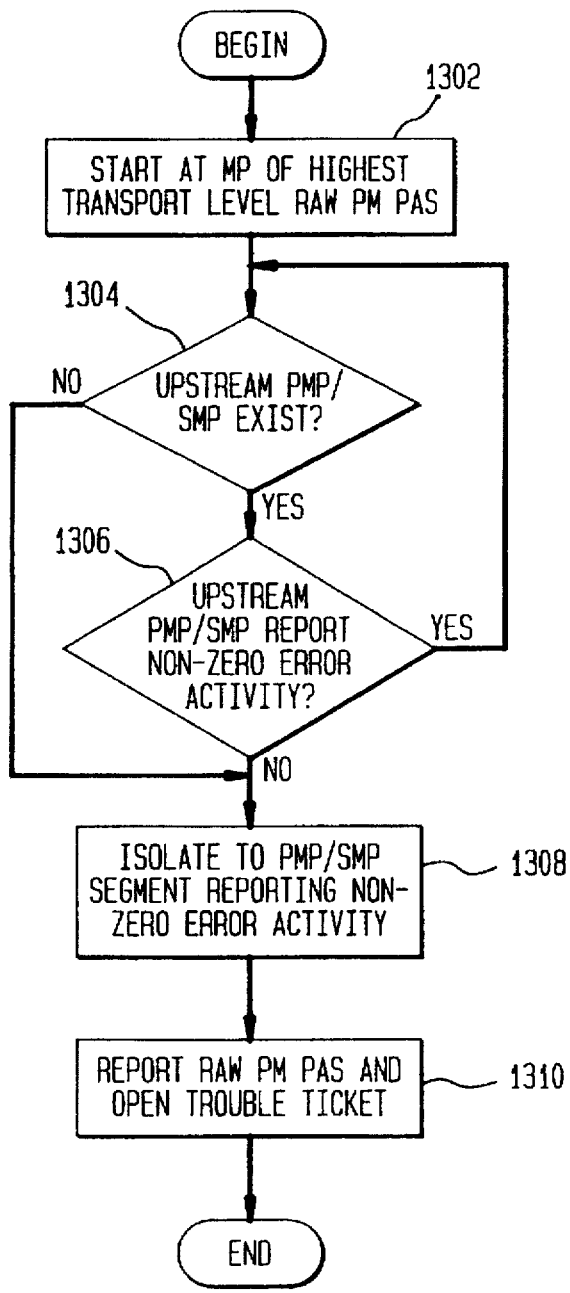
Figure 14:
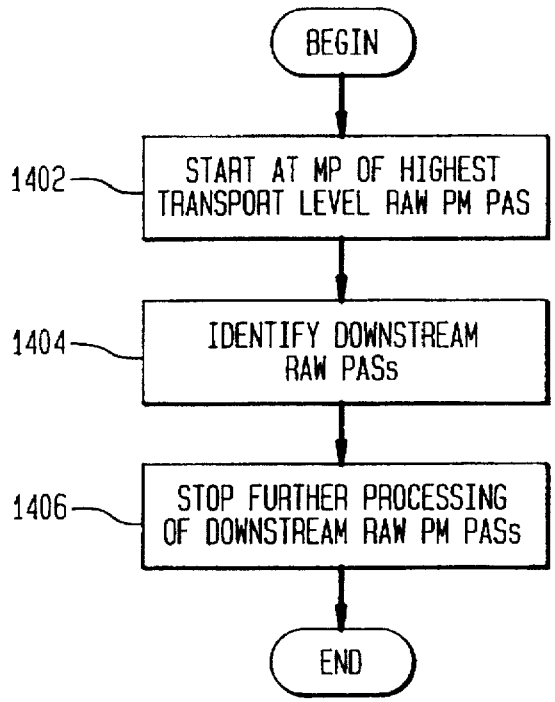

After the topology is retrieved, upstream and downstream isolation processing begin at steps 1206 and 1208, respectively. The general upstream isolation process is illustrated in FIG. 13. In the following description, it is assumed that the upstream isolation process is performed by network manager 131 in NML 130. Note that the upstream isolation process could also occur in EML 150 or SML 130.

As illustrated in FIG. 13, the upstream isolation process begins at the monitoring point where the highest transport level raw PM PAS is identified. Note that raw PM PASs need not be received in a particular order. In other words, the first raw PM PAS that is received by network manger 131 may exist in the middle of the path of the provisioned channel. For this reason, at step 1304, network manager 131 determines whether a PMP or SMP exists upstream of the monitoring point that reported the non-zero error activity used to generate the first raw PM PAS. Note that if a raw PM path PAS is being considered, all upstream monitoring points are analyzed, whereas if a line or section raw PM PAS is being considered, only the upstream monitoring points within a line entity are analyzed.

If an upstream PMP or SMP exists, network manager 131 determines, at step 1306, whether the upstream PMP or SMP has reported non-zero error activity. If non-zero error activity was reported, network manager 131 knows that the error activity is caused by a problem further upstream. The isolation process continues until the furthest upstream monitoring point reporting non-zero error activity is identified. If network manager 131 determines that an upstream PMP or SMP does not exist, or determines that an upstream PMP or SMP has not reported a corresponding PAS, then the problem is isolated to the furthest upstream PMP or SMP segment that reported the non-zero error activity. This is illustrated by step 1308. Finally, at step 1310, network manager 131 reports the furthest upstream raw PM PAS and opens a trouble ticket for service personnel dispatch.

At the same time network manager 131 is carrying out the upstream isolation process, the downstream isolation process is also started. The downstream isolation process of FIG. 14 begins at the monitoring point where the highest transport level raw PM PAS is identified. At step 1404, network manager then identifies all corresponding downstream raw PM PASs at step 1404. At step 1406, network manager 131 stops further processing on each of the corresponding downstream raw PM PASs. Further processing of the corresponding downstream PASs is unnecessary because the network problem identified by the downstream raw PM PASs has already been addressed through the processing of the upstream raw PM PASs. Note again that if a raw PM path PAS is being considered, all downstream monitoring points are analyzed, whereas if a line or section raw PM PAS is being considered, only the downstream monitoring points within a line entity are analyzed.

Figure 9:
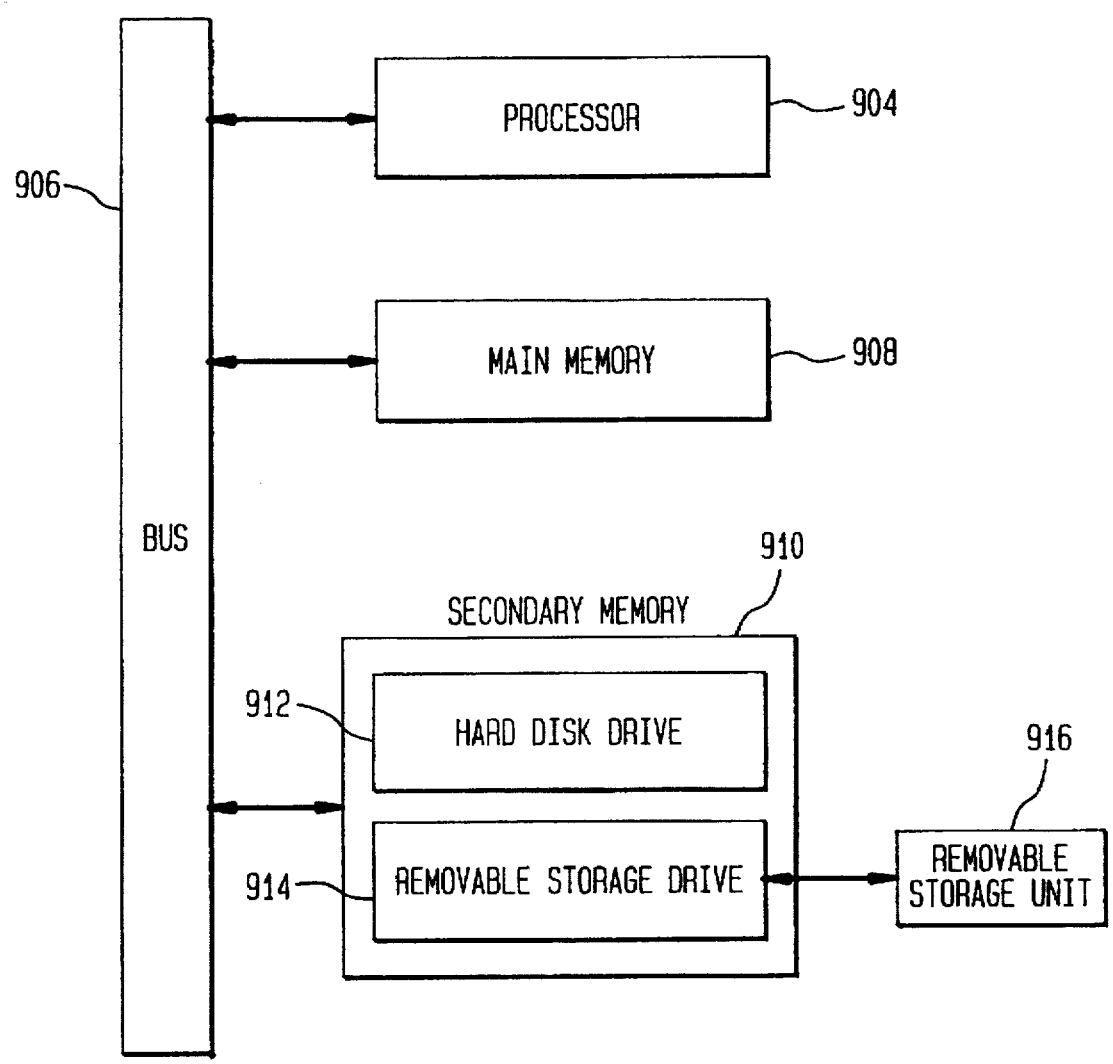
FIG. 9 illustrates a block diagram of a computer useful for implementing elements of the present invention.

In one embodiment, the invention is directed to a computer system operating as discussed herein. For example, functions in each of the network management layers 110, 120, 130, 140 and 150 are implemented using computer systems. An exemplary computer system 902 is shown in FIG. 9. The computer system 902 includes one or more processors, such as processor 904. The processor 904 is connected to a communication bus 906.

The computer system 902 also includes a main memory 908, preferably random access memory (RAM), and a secondary memory 910. The secondary memory 910 includes, for example, a hard disk drive 912 and/or a removable storage drive 914, representing a floppy disk drive, a magnetic tape drive, a compact disk drive, etc. The removable storage drive 914 reads from and/or writes to a removable storage unit 918 in a well known manner.

Removable storage unit 916, also called a program storage device or a computer program product, represents a floppy disk, magnetic tape, compact disk, etc. As will be appreciated, the removable storage unit 916 includes a computer usable storage medium having stored therein computer software and/or data.

Computer programs (also called computer control logic) are stored in main memory and/or the secondary memory 910. Such computer programs, when executed, enable the computer system 902 to perform the features of the present invention as discussed herein. In particular, the computer programs, when executed, enable the processor 904 to perform the features of the present invention. Accordingly, such computer programs represent controllers of the computer system 902.

In another embodiment, the invention is directed to a computer program product comprising a computer readable medium having control logic (computer software) stored therein. The control logic, when executed by the processor 904, causes the processor 904 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the invention has been particularly shown and described with reference to preferred embodiments thereof, it will be understood by those skilled in the relevant art that various changes in form and details may be made therein without departing from the spirit and scope of the invention.

What is claimed is:

1. A method in a network management layer for isolating a problem in a circuit path contained in a network, the circuit path including a plurality of network elements interconnected by a plurality of links having various transport levels, the method comprising the steps of:

(1) receiving a first problem alert signal at a first signal transport level from a first monitoring point associated with a first network element in the circuit path;

(2) identifying a second problem alert signal at a second signal transport level, said second problem alert signal being generated by a second monitoring point associated with a second network element in the circuit path, wherein said first signal transport level is mapped into said second signal transport level;

(3) determining whether said network management layer has access to enough information to isolate the problem; and (4) identifying a third monitoring point upstream of said first monitoring point that reports a third problem alert signal corresponding to said second problem alert signal.

2. The method of claim 1, further comprising the step of:

(5) moving to a next highest network management layer to isolate the problem if said step (3) determines that said network management layer does not have access to enough information to isolate the problem.

3. The method of claim 1, wherein said step (2) is repeated until a highest transport level is identified.

4. The method of claim 1, wherein said step (3) comprises the step of:

(a) determining if information of all network elements in the circuit path are available to the network management layer.

5. The method of claim 1, wherein said step (4) comprises the step of:

(a) identifying a third monitoring point upstream of said second monitoring point that reports a corresponding problem alert signal at said second signal transport level, wherein said second signal transport level defines a path entity.

6. The method of claim 2, wherein said step (5) comprises the step of:

(a) identifying a third monitoring point upstream of said second monitoring point that reports a corresponding problem alert signal at said second signal transport level, wherein said second signal transport level defines a line entity.

7. The method of claim 1, further comprising the step of (6) discontinuing further processing for problem alert signals corresponding to said first problem alert signal that are received by the network management layer from monitoring points downstream from said first monitoring point.

8. The method of claim 1, wherein said step (1) comprises the step of receiving a threshold crossing alert at a first signal transport level from a first monitoring point associated with a network element in the circuit path, wherein said first threshold crossing alert is triggered by a monitored parameter exceeding a predefined threshold.

9. A method in a network management layer for isolating a problem in a circuit path contained in a network, the circuit path including a plurality of network elements interconnected by a plurality of links having various transport levels, the method comprising the steps of:

(1) receiving a first report of error activity at a first signal transport level from a monitoring point associated with a network element in the circuit path;

(2) determining whether a second report of error activity has been received for a next highest signal transport level, wherein said first signal transport level is mapped into a second signal transport level;

(3) repeating said step (2) until a highest signal transport level reporting an indication of error activity is identified; and (4) isolating the problem through analysis at said highest signal transport level.

10. The method of claim 9, wherein said step (1) comprises the step of receiving a threshold crossing alert at said first signal transport level, wherein said threshold crossing alert is triggered by a monitored parameter exceeding a predefined threshold.

11. A computer program product for use with a computer system, comprising:

a computer usable medium having computer readable program code means embodied in said medium for causing the computer system to isolate a problem in a circuit path contained in a network, the circuit path including a plurality of network elements interconnected by a plurality of links having various transport levels, wherein the isolation is effected in a network management layer, said computer readable program code means comprising:

first computer readable program code means for causing a computer to effect a reception of a first problem alert signal at a first signal transport level from a first monitoring point associated with a first network element in the circuit path;

second computer readable program code means for causing a computer to effect an identification of a second problem alert signal at a second signal transport level that produces a second problem alert signal being generated by a second monitoring point associated with a second network element in the circuit path, wherein said first signal transport level is mapped into said second signal transport level;

third computer readable program code means for causing a computer to effect a determination of whether said network management layer has access to enough information to isolate the problem; and fourth computer readable program code means for causing a computer to effect an identification of a third monitoring point upstream of said second monitoring point that reports a third problem alert signal corresponding to said second problem alert signal.

12. The computer program product of claim 11, wherein said second computer readable program code means comprises:

computer readable program code means for causing a computer to effect an identification of a highest signal transport level that reports corresponding error activity, wherein said first signal transport level is mapped into said highest signal transport level.

13. The computer program product of claim 11, wherein said second computer readable program code means comprises:

computer readable program code means for causing a computer to effect a determination of whether all network elements in the circuit path are available to the network management layer.

14. The computer program product of claim 11, wherein said fourth computer readable program code means comprises:

computer readable program code means for causing a computer to effect an identification of a third monitoring point upstream of said second monitoring point that reports a corresponding problem alert signal at said second signal transport level, wherein said second signal transport level defines a path entity.

15. The computer program product of claim 11, wherein said fourth computer readable program code means comprises:

computer readable program code means for causing a computer to effect an identification a third monitoring point upstream of said second monitoring point that reports a corresponding problem alert signal at said second signal transport level, wherein said second signal transport level defines a line entity.

16. The computer program product of claim 11, further comprising:

fifth computer readable program code means for causing a computer to effect a discontinuation of further processing for problem alert signals corresponding to said first problem alert signal that are received by the network management layer from monitoring points downstream from said first monitoring point.

17. The computer program product of claim 11, wherein said first computer readable program code means comprises:

computer readable program code means for causing a computer to effect a reception of a threshold crossing alert at a first signal transport level from a first monitoring point associated with a network element in the circuit path, wherein said first threshold crossing alert is triggered by a monitored parameter exceeding a predefined threshold.

18. A computer program product, comprising:

a computer usable medium having computer readable program code means embodied in said medium that isolates a problem in a circuit path contained in a network, the circuit path including a plurality of network elements interconnected by a plurality of links having various transport levels, said computer readable program code means comprising:

first computer readable program code means for causing a computer to effect a reception of a problem alert signal at a first signal transport level from a monitoring point associated with a network element in the circuit path second computer readable program code means for causing a computer to effect a determination of whether a second problem alert signal has been received for a next highest signal transport signal level, wherein said first signal transport level is mapped into said second signal transport level, wherein said second computer readable program code means causes a computer to effect a repetition of said determination until a highest signal transport level reporting an a corresponding problem alert signal is identified; and third computer readable program code means for causing a computer to effect an isolation of the problem through analysis at said highest signal transport level.

19. The computer program product of claim 18, wherein said first computer readable program code means comprises:

computer readable program code means for causing a computer to effect a reception of a threshold crossing alert at a first signal transport level from a first monitoring point associated with a network element in the circuit path, wherein said first threshold crossing alert is triggered by a monitored parameter exceeding a predefined threshold.

* * * * *